(12) United States Patent
Wys et al.

(10) Patent No.: US 10,197,134 B2
(45) Date of Patent: Feb. 5, 2019

(54) HYBRID TRANSMISSION HAVING ELECTRO-MAGNETICALLY ACTUATED PAWL CLUTCH

(71) Applicant: Ford Global Technologies, LLC, Dearborn, MI (US)

(72) Inventors: Dennis Neil Wys, Ann Arbor, MI (US); Brian Richard Light, Flat Rock, MI (US); Matthew Stephen Eiszler, Pinckney, MI (US); David Capoccia, Rochester Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 698 days.

(21) Appl. No.: 14/501,857

(22) Filed: Sep. 30, 2014

(65) Prior Publication Data

US 2016/0091062 A1    Mar. 31, 2016

(51) Int. Cl.
*F16H 3/72* (2006.01)
*F16H 3/44* (2006.01)
(Continued)

(52) U.S. Cl.
CPC ............ *F16H 3/727* (2013.01); *F16D 27/102* (2013.01); *F16D 41/14* (2013.01); *F16H 3/44* (2013.01); *F16D 27/118* (2013.01); *F16H 2037/0866* (2013.01); *F16H 2200/2005* (2013.01); *F16H 2200/2094* (2013.01); *F16H 2716/08* (2013.01); *Y10S 903/906* (2013.01);
(Continued)

(58) Field of Classification Search
CPC .......... F16D 41/12; F16D 41/16; F16D 41/30; F16D 27/102; F16D 41/14; B60K 6/365; B60K 6/383; B60K 6/387; F16H 3/44; F16H 3/727
See application file for complete search history.

(56) References Cited

U.S. PATENT DOCUMENTS 2,914,151 A    11/1959   Maurice et al.
3,168,175 A     2/1965   Straub et al.
(Continued)

FOREIGN PATENT DOCUMENTS

CN   103807319 A      5/2014
DE     19606771 A1 *  8/1997  ............... B60K 6/26

OTHER PUBLICATIONS

Chinese Office Action dated Jul. 3, 2018 for Chinese Application No. 201510589662.1, 6 pages.

*Primary Examiner* — Colby M Hansen
(74) *Attorney, Agent, or Firm* — David B. Kelley; Brooks Kushman P.C.

(57) ABSTRACT

An electro-magnetically actuated pawl clutch is adapted to establish a fixed overdrive ratio in a powersplit type hybrid gearing arrangement. The electro-magnetically actuated clutch includes a first race splined to the transmission input shaft and a second race integrally formed into a first gear that is supported for rotation about the input shaft. Electrical current in a non-rotating coil establishes a magnetic field in the first race. The magnetic field causes a set of pawls to pivot with respect to the first race and to engage a cam surface in the second race. The pawls and cams are designed such that, when engaged, the second race can rotate faster than the inner race but cannot rotate slower. The first gear meshes with a second gear fixed to the transmission output shaft.

6 Claims, 6 Drawing Sheets

(51) Int. Cl.
*F16D 41/14* (2006.01)
*F16D 27/102* (2006.01)
F16D 27/118 (2006.01)
F16H 37/08 (2006.01)

(52) U.S. Cl.
CPC .......... *Y10S 903/91* (2013.01); *Y10S 903/913* (2013.01); *Y10S 903/918* (2013.01)

(56) References Cited

U.S. PATENT DOCUMENTS

| | | | |
|---|---|---|---|
| 5,681,242 A | 10/1997 | Bates | |
| 5,788,006 A * | 8/1998 | Yamaguchi | B60K 6/365 180/65.235 |
| 8,217,543 B2 | 7/2012 | Ishida et al. | |
| 8,727,932 B2 | 5/2014 | Shibata et al. | |
| 9,097,299 B2 * | 8/2015 | Sharp | F16D 41/16 |
| 9,108,501 B2 | 8/2015 | Ortmann et al. | |
| 2011/0166727 A1 * | 7/2011 | Light | B60K 6/445 701/22 |
| 2011/0177900 A1 | 7/2011 | Simon | |
| 2011/0239819 A1 * | 10/2011 | Shibahata | B60K 6/383 74/665 A |
| 2011/0290608 A1 * | 12/2011 | Bird | F16D 27/004 192/45.1 |
| 2012/0122622 A1 * | 5/2012 | Turnbull | B60K 6/48 475/5 |
| 2013/0341150 A1 | 12/2013 | Ikegawa | |
| 2015/0202953 A1 * | 7/2015 | Iwase | B60K 6/383 475/5 |

\* cited by examiner

HYBRID TRANSMISSION HAVING ELECTRO-MAGNETICALLY ACTUATED PAWL CLUTCH

TECHNICAL FIELD

This disclosure relates to the field of vehicle clutches. More particularly, the disclosure pertains to an electro-magnetically actuated pawl clutch used within a hybrid electric powertrain.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising.

Some transmissions, called discrete ratio transmissions, are configured to establish a finite number of speed ratios between an input shaft and an output shaft. When the currently selected ratio is no longer appropriate, a discrete ratio transmission must shift to a different one of the available speed ratios. Other transmissions, called continuously variable transmissions (CVTs), are capable of establishing any speed ratio between lower and upper limits. CVTs are capable of making frequent fine speed ratio adjustments which are not perceivable by vehicle occupants.

Many transmissions use hydraulically actuated friction clutches to establish various power flow paths. Hydraulic actuation is suited for clutches that selectively couple rotating elements to one another because pressurized hydraulic fluid can be routed from a stationary housing to rotating components between seals. Therefore, the hydraulic actuator can rotate with one of the rotating elements. When there are multiple hydraulically actuated clutches, the clutches often share an engine drive pump and share many of the valve body components used to regulate the pressure.

Hybrid vehicle transmissions improve fuel economy by providing energy storage. In a hybrid electric vehicle, for example, energy may be stored in a battery. The battery may be charged by operating the engine to produce more power than instantaneously required for propulsion. Additionally, energy that would otherwise be dissipated during braking can be captured and stored in the battery. The stored energy may be used later, allowing the engine to produce less power than instantaneously required for propulsion and thereby consuming less fuel.

SUMMARY OF THE DISCLOSURE

An electro-magnetically actuated clutch includes first and second rotating races, a non-rotating coil, and pawls supported by the first race that pivot to engage a cam surface in the second race in response to a magnetic field in the first race established by electric current in the non-rotating coil. The pawls may engage the cam surface to preclude relative rotation of the races in one direction while permitting relative rotation in the opposite direction. A return spring may force the pawl out of engagement with the cam surface when the electrical current is withdrawn.

A transmission includes a first shaft, a first gear supported for rotation about the first shaft, and one or more pawls supported to rotate with the first shaft and to selectively couple the first gear to the first shaft in response to a magnetic field established within the first shaft by electrical current in a non-rotating coil. The transmission may also include a second shaft offset from the first shaft fixedly coupled to a second gear in continuous meshing engagement with the first gear. The transmission may further include a planetary gear set with a sun gear driveably connected to a first electric machine, a ring gear driveably connected to the second shaft and to a second electric machine, and a carrier drivably connected to the first shaft.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A group of rotating elements are fixedly coupled to one another if they are constrained to rotate as a unit in all operating conditions. Rotating elements can be fixedly coupled by spline connections, welding, press fitting, machining from a common solid, or other means. Slight variations in rotational displacement between fixedly coupled elements can occur such as displacement due to lash or shaft compliance. In contrast, two rotating elements are selectively coupled by a shift element when the shift element constrains them to rotate as a unit whenever it is fully engaged and they are free to rotate at distinct speeds in at least some other operating condition. Two rotating elements are coupled if they are either fixedly coupled or selectively coupled. Two rotating elements are driveably connected if a series of gears and shafts is capable of transmitting power from one to the other and establishes a fixed speed ratio between the two elements.

Figure 1:
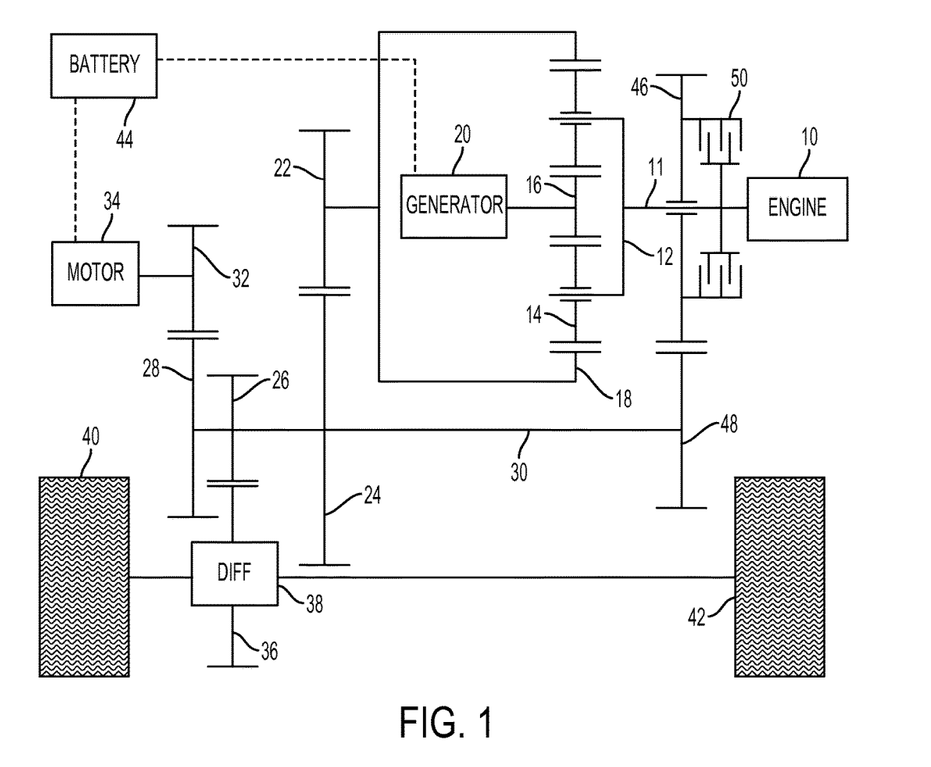
FIG. 1 is a schematic diagram of a gearing arrangement for a hybrid electric powertrain.

FIG. 1 schematically illustrates a kinematic arrangement for a power-split type hybrid electric vehicle. Power is provided by engine 10 which is fixedly coupled to planet carrier 12 via transmission input shaft 11. A set of planet gears 14 are supported for rotation with respect to carrier 12. Sun gear 16 and ring gear 18 are each supported for rotation about the same axis as carrier 12 and each mesh with the planet gears 14. Generator 20 is fixedly coupled to sun gear 16. Layshaft gear 22 is fixedly coupled to ring gear 18 and meshes with layshaft gear 24. Layshaft gear 24 is fixedly coupled to layshaft gears 26 and 28 via shaft 30. Layshaft gear 32 meshes with layshaft gear 28 and is fixedly couple to motor 34. Layshaft gear 26 meshes with layshaft gear 36 which is the input to differential 38. Differential 38 drives wheels 40 and 42 allowing slight speed differences as the vehicle turns a corner.

Generator 20 and motor 34 are both reversible electric machines. The terms generator and motor are used merely as labels. Both machines are capable of converting electrical power to mechanical power or converting mechanical power to electrical power. For example, each machine may be a synchronous motor in combination with a three phase inverter. Both machines are electrically connected to battery 44. In some circumstances, engine 10 may generate more power than is delivered to the vehicle wheels 40 and 44 with the excess power stored in battery 44. In other circumstances, power may flow from battery 44 permitting engine 10 to produce less power than the instantaneous demand of the vehicle. For example, the engine 10 may be off while power to propel the vehicles comes from battery 44.

The powertrain of FIG. 1 can be operated in a continuously variable mode with battery 44 neither providing nor absorbing power. The torque applied to generator 20 and the torque applied to layshaft gear 22 are both related to the torque generated by engine 10 based on the number of teeth on sun gear 16 and the number of teeth on ring gear 18. Specifically, $$T_{gen} = \frac{N_{sun}}{N_{sun} + N_{ring}} T_{eng}$$

$$T_{gear22} = \frac{N_{ring}}{N_{sun} + N_{ring}} T_{eng}$$

where $T_{eng}$ is the torque generated by engine 10, $T_{gen}$ is the torque absorbed by the generator 20, $T_{gear22}$ is the torque absorbed by gear 22, $N_{sun}$ is the number of teeth on sun gear 16, and $N_{ring}$ is the number of teeth on ring gear 18. The engine speed is a weighted average of the generator speed and the speed of gear 22.

$$\omega_{eng} = \frac{N_{sun}}{N_{sun} + N_{ring}} \omega_{gen} + \frac{N_{ring}}{N_{sun} + N_{ring}} \omega_{gear22}$$

When the vehicle is moving slowly, gear 22 rotates slowly and generator 20 rotates in the opposite direction of engine 10. Power generated by the engine is split by the planetary gear set. A portion of the power is transmitted mechanically to shaft 30 from carrier 12 to ring gear 18 to gear 22 to gear 24. The remaining power is transmitted from carrier to generator 20 which converts the power to electrical power. Motor 34 converts the electrical power to mechanical power which is transmitted to shaft 30 by gear 32 and 28. Although both power transfer paths are subject to some parasitic losses, conversions between electrical power and mechanical power typically involve more power loss than purely mechanical transfer. As the ratio of the speed of shaft 30 to the speed of engine 10 increases, a point is reached at which generator 10 is stationary. At this ratio, all of the power is transferred mechanically. At higher overdrive ratios, generator 20 rotates in the same direction as engine 10. Power circulates from generator 20, through the mechanical power flow path to shaft 30, through gears 28 and 32 to motor 34 which converts the power into electrical power to drive generator 20. The parasitic losses associated with the circulation of power tend to make operation at overdrive ratios inefficient.

The powertrain of FIG. 1 includes an additional power flow path to provide efficient power transfer at overdrive speed ratios. Specifically, layshaft gear 46 is supported for rotation about transmission input shaft 11. Layshaft gear 48 is fixedly coupled to shaft 30 and meshes with layshaft gear 46. Clutch 50 selectively couples layshaft gear 46 to shaft 11. When clutch 50 is engaged, power is transferred mechanically from engine 10 to shaft 30 via gears 46 and 48. In this fixed ratio mode of operation, battery 44 can provide additional power via either generator 20 or motor 34 or can be charged via either electrical machine. Use of the fixed ratio mode for steady state cruising significantly reduces fuel consumption because both the engine and the transmission operate efficiently.

Figure 2:
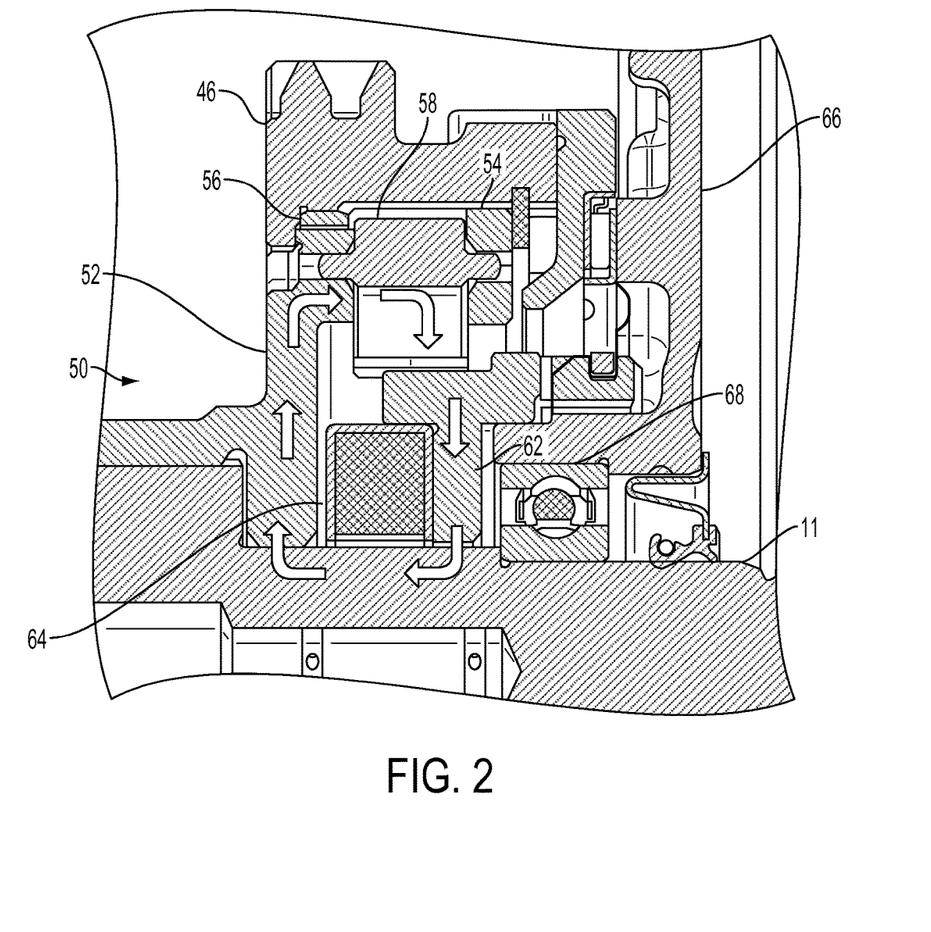
FIG. 2 is a cross section of an electro-magnetically actuated pawl clutch suitable for use in the gearing arrangement of FIG. 1.
Figure 3:
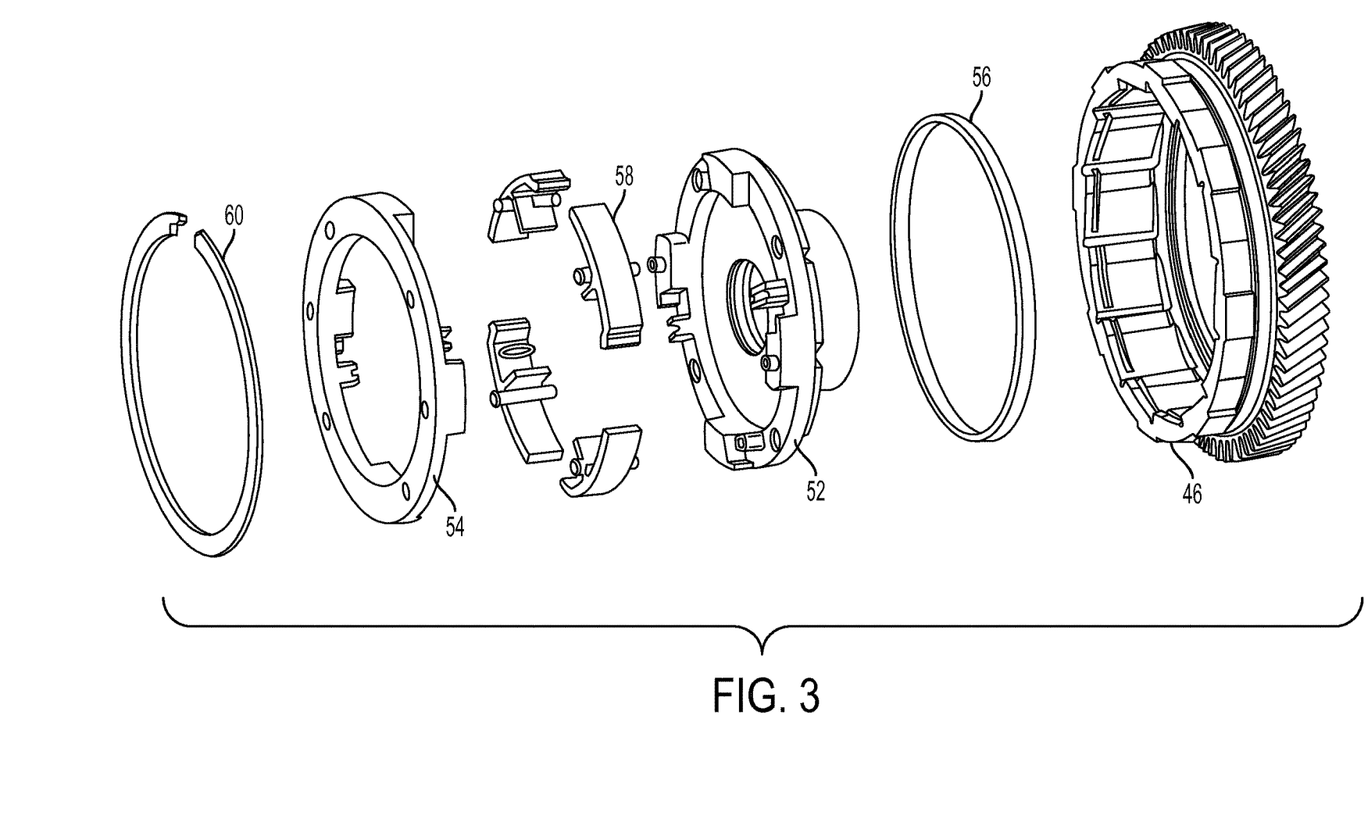
FIG. 3 is an exploded view of the clutch of FIG. 2.
Figure 4:
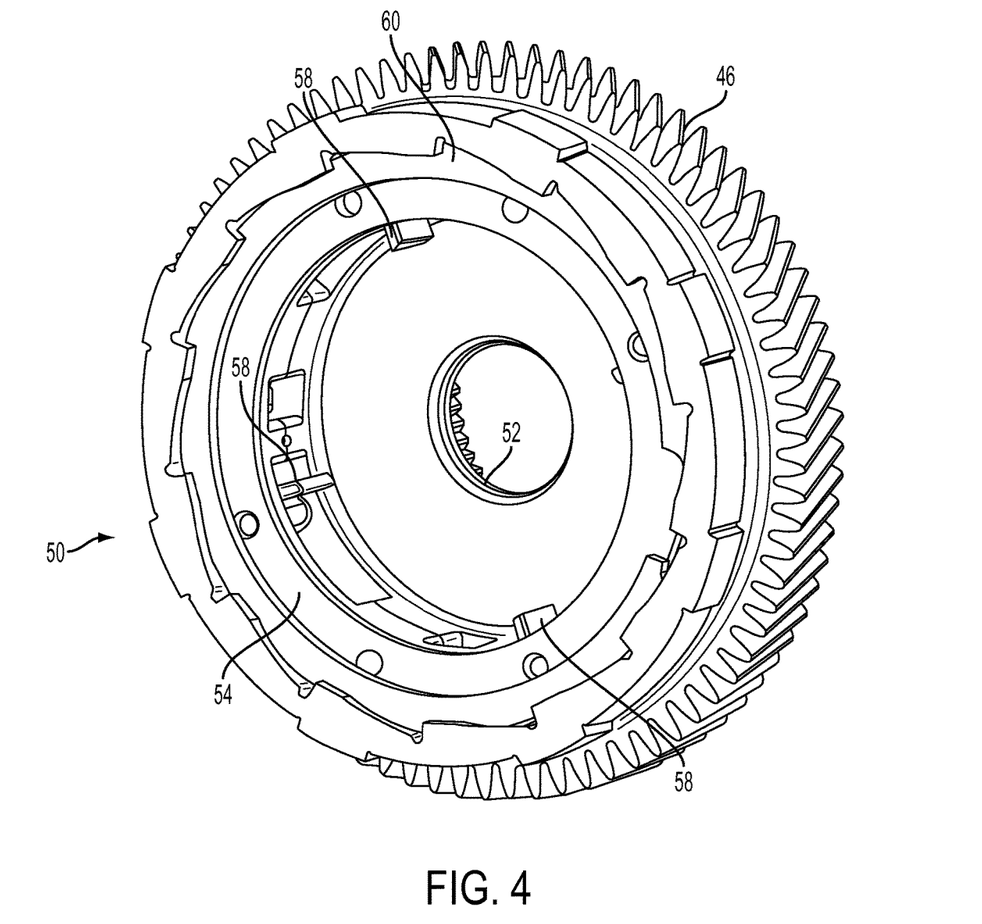
FIG. 4 is a pictorial view of the clutch of FIG. 2.

Since clutch 50 is the only clutch in the powertrain of FIG. 1, use of a hydraulically actuated clutch would require addition of a pump and valve body. Therefore, a different method of actuating clutch 50 is desired. FIGS. 2 through 4 illustrate an electro-magnetically actuated pawl clutch suitable for selectively coupling gear 46 to shaft 11. FIG. 2 shows a cross sectional view of clutch 50 as installed in the transmission. FIG. 3 shows an exploded pictorial view and FIG. 4 shows an assembled pictorial view before installation into the transmission. The outer race is formed integrally with gear 46 although in some embodiments it could be formed separately and joined by a spline or other means. The inner race of the clutch includes an outer half 52 and an inner half 54. Bushing 56 is inserted between the inner race and the outer race to reduce friction and to ensure concentricity. Four pawls 58 are held between the two halves of the inner race. The number of pawls may vary among embodiments. As discussed in more detail below, when clutch 50 is disengaged, these pawls are contained within pockets formed into the inner race halves. When clutch 50 is engaged, these pawls pivot and engage a cam surface in the outer race. The inner race is held in position axially by snap ring 60.

After assembly of clutch 50, the outer half of the inner race 52 is splined to the input shaft 11. A coil support 62 and coil 64 are mounted to a front support 66 of the transmission. A wire connects the coil to a transmission controller (not shown). Then, the input shaft 11 and clutch 50 are inserted into front support 66. Ball bearing 68 locates the input shaft with respect to the front support and permits rotation of the input shaft with very low parasitic drag. When electrical current is supplied to coil 64, a magnetic circuit is established as indicated by the wide arrows. By selecting appropriate materials and controlling part location, the magnetic flux is directed from the coil support 62 through input shaft 11, outer half of the inner race 52, and pawl 58 and then back to coil support 62. The flux passes through only two air gaps:

a gap between coil support 62 and input shaft 11 and a gap between pawls 58 and coil support 62. Magnetic attraction forces are created between the corresponding parts at each of these air gaps. Other part geometry could be envisioned which would establish a magnetic field in the inner race in response to electrical current in a non-rotating coil, including other arrangement with only two air gaps.

Figure 5:
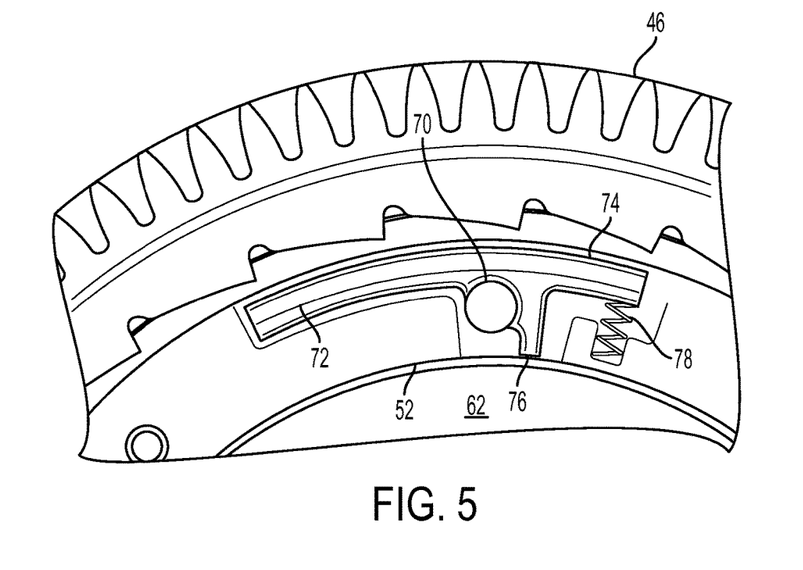
FIG. 5 is a detailed cross-sectional view of the clutch of FIG. 2 in a disengaged state.
Figure 6:
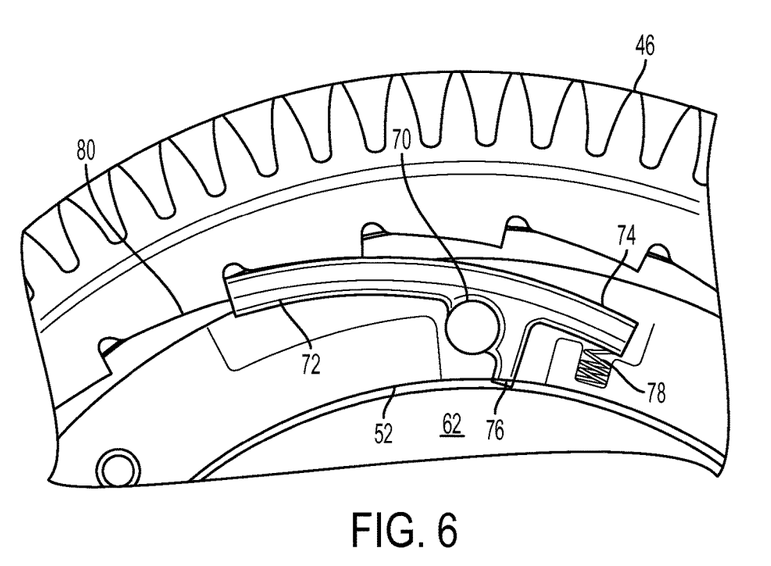
FIG. 6 is a detailed cross-sectional view of the clutch of FIG. 2 in an engaged state.

FIGS. 5 and 6 show a detailed cross-sectional view of clutch 50 perpendicular to the cross sectional view of FIG. 2. Each pawl 58 includes a pin 70 about which the pawl pivots with respect to the inner race. Each pawl includes a first circumferential lobe 72 and a second circumferential lobe 74 extending in opposite directions from the pin 70. In the disengaged position shown in FIG. 5, these lobes follow the contour of the inner race. A radial lobe 76 extends toward, but does not touch, the coil support 62. The mass of the various lobes are balanced such that centrifugal forces generated by rotation of the inner race do not exert any net torque tending to pivot the pawls 58. Return spring 78 exerts a force between inner race and the second circumferential lobe 74 to force the pawl into the disengaged position when electrical current is not flowing to the coil. Although a linear compression spring is shown, a tension spring or torsion spring may also be employed as a return spring.

FIG. 6 shows the pawl 58 in the engaged position. Magnetic attractive forces between the radial lobe 76 and the coil support 62 overcome the force of return spring 78 to pivot the pawl. In the pivoted position, the first circumferential lobe 72 engages a cam surface 80 formed into the outer race. The cam surface is shaped to preclude clockwise rotation of the outer race with respect to the inner race when the clutch is engaged. Relative rotation in the opposite direction, however, is possible with minimal drag. When the outer race rotates in a counter-clockwise direction, the cam surface pushes the pawl toward the disengaged position. Alternatively, the cam surface could be shaped to preclude relative rotation in both directions when the clutch is engaged. The tip of lug 74 and the corresponding surface of cam 80 may include some back-taper such that torque transfer tends to pivot the pawl 58 toward the engaged position. Such back-taper permits a reduction or elimination of the electrical current once the clutch is engaged without disengagement. In the pictured embodiment, the cam profile repeats 14 times around the circumference of the inner surface of the outer race. Two pawls, on opposite sides of the inner race, come into engagement as the clutch applies. Selecting different numbers of cam profiles and pawls changes the number of pawls that engage and also changes the maximum rotation before the pawls engage, called the lash. In the pictured embodiment, the pawls pivot about axes parallel to the axis of rotation to extend radially between the races. In other embodiments, the pawls may pivot about radial axes and extend axially between the races.

Friction clutches are capable of transmitting torque between elements that are rotating at different speeds. The transmitted torque tends to bring the components to the same speed. A pawl clutch, on the other hand, selectively couples elements by establishing a positive engagement as opposed to frictional engagement. As a result, a pawl clutch can only transmit torque between elements that are rotating at the same speed. Engaging a pawl clutch when the elements are at different speeds would produce a sudden change in speeds which is likely to be unpleasant to vehicle occupants and may even cause transmission components to fail. Therefore, control of element speeds at the time of clutch engagement is important.

When the vehicle is at low speed, the transmission of FIG. 1 is operated in the continuously variable mode. No current is supplied to coil 64 so clutch 50 is disengaged. When the controller determines that operation in the fixed ratio overdrive mode is preferable, the controller first transitions to a more overdrive speed ratio than the fixed ratio. Then, the controller commands current to coil 64 causing the pawls to pivot. The clutch does not engage immediately because gear 46 is rotating faster than shaft 11 in this condition. The controller, still controlling the speed ratio in the continuously variable mode, gradually permits the engine speed to increase. Once the fixed ratio is reached, clutch 50 will engage.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A transmission comprising:
   a first shaft supported for rotation about a first axis;
   a first gear defining a cam surface and supported for rotation about the first shaft;
   a pawl pivotably supported by the first shaft; and
   a non-rotating coil configured to establish a magnetic field in the first shaft and in the pawl in response to an electrical current, forcing the pawl to pivot into engagement with the cam surface.

2. The transmission of claim 1 wherein engagement of the pawl with the cam surface precludes rotation of the first gear relative to the first shaft in one direction while permitting relative rotation in an opposite direction.

3. The transmission of claim 2 wherein the pawl is supported to pivot with respect to the first shaft about a pivot axis parallel to the first axis.

4. The transmission of claim 3 wherein the cam surface faces toward the first axis.

5. The transmission of claim 1 further comprising:
   a second shaft supported for rotation about a second axis parallel to and offset from the first axis; and
   a second gear fixedly coupled to the second shaft and in continuous meshing engagement with the first gear.

6. The transmission of claim 5 further comprising:
   a sun gear fixedly driveably connected to a first electric machine;
   a ring gear fixedly driveably connected to the second shaft and to a second electric machine;
   a carrier fixedly driveably connected to the first shaft; and
   a plurality of planet gears supported for rotation with respect to the carrier and meshing with the sun gear and the ring gear.

* * * * *